United States Patent [19]
Lindert

[11] Patent Number: 4,811,457
[45] Date of Patent: Mar. 14, 1989

[54] DEBONING MACHINE

[76] Inventor: Heinrich Lindert, Koelkebecker Str. 62, 4802 Halle, Fed. Rep. of Germany

[21] Appl. No.: 151,812

[22] Filed: Feb. 3, 1988

[30] Foreign Application Priority Data

Jul. 2, 1987 [DE] Fed. Rep. of Germany ..... 37038362

[51] Int. Cl.⁴ ............................................. A22C 21/00
[52] U.S. Cl. ............................................. 17/11; 17/46
[58] Field of Search ............................ 17/11, 1 G, 46

[56] References Cited
U.S. PATENT DOCUMENTS

3,510,908  5/1970  Segur et al. ............................ 17/11
4,669,150  6/1987  Manmoto et al. ...................... 17/11
4,736,492  4/1988  Hazenbroek et al. ................. 17/46

Primary Examiner—Willie G. Abercrombie
Attorney, Agent, or Firm—Spencer & Frank

[57] ABSTRACT

A machine for processing objects, such as chicken leg parts or the like, includes a conveyor which has a plurality of displacement frames mounted thereon for displacement with the conveyor. Each of the displacement frames is equipped with a gripping device which grips a small portion of the object to be processed. A sawing or cutting device is arranged at an upstream portion of the trajectory of movement of the displacement frames and is operative for longitudinally cutting the respective object into two parts. An additional holding device including either oppositely located vertical nail plates or holding conveyors holds the object firmly at a cutting location, while a punch dissociates a cartilaginous joint of the object from the meat. Downstream of the additional holding device, there is arranged a spreading wedge which spreads the parts of the object apart until they break away from the zone of the object that is held by the gripping device.

19 Claims, 5 Drawing Sheets

DEBONING MACHINE

BACKGROUND OF THE INVENTION

The invention relates to a processing machine for poultry parts, meat parts, or the like. The parts are used as work pieces in conjunction with with a rotating supply arrangement, such as a chain or band, on which there are arranged movable frames with gripping arms, plates with protruding nails, or the like serving as holding arrangements for the respective holding of work pieces.

An apparatus of this type may, for example, be used to separate bones from legs of poultry. Deskeletonizing of other meat pieces is also possible with this apparatus. There exists a great demand for white poultry meat, for example, breast filets of young chickens and roosters. Apart from the breast meat, it should also be possible, to make use of white meat from the poultry wings, for which rationally operating processing arrangements are required. The meat from the chicken wings or legs can be used, for example, for processing of gourmet products, such as poultry salad, with or without skin.

The manual removal of bones from poultry parts is time-consuming and clumsy, and therefore labor-intensive. Consequently it is customary to separate the meat-rich upper part above a bone joint from the lower part, and to only use the meat of the upper part.

From the prior art it is known to separate bones from poultry meat, on the one hand the protruding end of a bone, and on the other hand, the meat surrounding the bone are clamped into respective clamping arrangements, which move relative to one another and consequently separate the meat from the bones or the like by a stripping-off movement. But this does not lead to a clean cut, but to a disadvantageous tearing.

SUMMARY OF THE INVENTION

It is therefore an object of the invention to device a processing machine which enables a user, particularly in the case of poultry, to separate the meat from bones embedded therein, by cutting off the meat, or cutting the meat out as completely as possible in large pieces by way of an automatic processing.

This object is attained, according to invention, in a processing machine of the afore-described kind, by a ring-shaped cutting arrangement removing the cartilage and bones from the meat, which arrangement is automatically displacable transversely to the moving direction of the work-piece, and which is supported on the machine frame.

In a punching-like cutting arrangement of this type it is possible to automatically cut-out in particular cartilege from joints of poultry parts within a processing machine, which has work pieces passing therethrough, so that in the case of a transversely separated poultry part the bones separated from one another (upper bone and lower bone), and in this manner the meat can be easily removed and largely recovered entirely.

This object is further attained, according to invention, by a processing machine, which has a cutting station with a saw, and an additional clamping arrangement for the work piece, such as a meat part, poultry part, or the like. In this manner, it is possible to cut the meat containing the bone, for example a poultry part, along the longitudinal direction of the bone in the center thereof, and thereby simply remove both bone parts from the respective meat parts in a simple manner.

The work piece is preferably clamped on the horizontal displacable movable frame, projects upwardly therefrom, and can be clamped with a small portion thereof along its length on the gripper arms. In this manner, the greater part of the meat piece can be sawed through above the clamping location, while only a small longitudinal portion is required for clamping and therefore, cannot be used for producing meat. But this portion, in the case of poultry parts, contains large tendon or fiber portions, which in any case are not very valuable. In a poultry part clamped along this manner, only the lowermost portion of the lower poultry part is clamped, and the greatest part of the lower part and the upper part emanating from the cartilage joint can be used for further processing. The meat portion is preferably clamped in a frozen state at a temperature slightly below 0° C. onto the gripper arm of the vehicle frame.

Specific further objects which avoid the disadvantages of the prior art are listed further hereinafter.

More particularly, it is an object of the present invention to provide a machine for processing meat pieces, which does not possess the drawbacks of the heretofore used approaches.

Still another object of the present invention is to device a processing machine of the type here under consideration which renders it possible to fully automate the dissociation of the meat from the bones and cartilage.

It is yet another object of the present invention to design the above processing machine in such a manner as to achieve reliable dissociation of the bones and cartilage from the meat to assure easy separation of such inedible inclusions from the meat.

A concomitant object of the present invention is so to construct the processing machine of the above type as to be relatively simple in construction, inexpensive to manufacture, easy to use, and yet reliable in operation.

In keeping with these objects and others which will become apparent hereafter, one feature of the present invention resides in a machine for processing objects such as poultry parts, meat pieces or the like. The processing machine includes a machine frame, endless conveyor means mounted on the frame for displacement, and a plurality of holding means mounted on the conveyor means for displacement therewith and each including a displacement frame and gripping means mounted on the displacement frame and operative for firmly holding one of the objects in each instance. According to the present invention, there is provided means for dissociating bones and/or cartilaginous inclusions from meat tissue of the respective object, including a punch-type annular dissociating device mounted on the machine frame for automatic displacement transversely to the displacement direction of the objects.

Advantageously, the dissociating device includes an annular punching element having a diameter corresponding to that of a cartilaginous joint. The annular punching element has a free end facing the object and advantageously having a cutting edge. It is particularly advantageous when the cutting edge has a toothed configuration.

According to a further aspect of the present invention, there is further provided additional holding means for holding the meat of the object at a separating station. Then, the dissociating device is advantageously coupled with the additional holding means. It is advantageous when the additional holding means includes a shaft which is configured as a turnable and axially shiftable hollow shaft received in a lifting cylinder member. Then, there may be provided a hollow support shaft for an annular punching knife for the object, which is mounted in the hollow shaft of the additional holding means for shifting into and out of the same. The hollow shaft of the additional holding means has a free end portion facing the object and advantageously provided with a holding punch zone which may have an annular or a rectangular configuration.

It is also advantageous when there is further provided a further hollow shaft arranged in the hollow shaft of the additional holding means that is provided with the holding punch zone and serving as a punching element. The further hollow shaft may be provided with cutting edges or with toothed formations.

According to another facet of the present invention, the additional holding means for the object includes two vertically oriented nail plates which are movable horizontally toward and away from one another upwardly of the displacement path of the displacement frame. In this context, it is particularly advantageous when the additional holding means further includes lifting cylinder members mounted on the machine frame and horizontally extending shafts movable into and out of the lifting cylinder members and having the nail plates mounted thereon.

The processing machine of the present invention advantageously further comprises sawing means arranged upstream of the additional holding means and including an endless sawing band trained about a driving wheel and a reversing wheel that are mounted for rotation about vertically oriented axes, the sawing means operating in a range situated upwardly of the conveying means. The axles of the driving and reversing wheels are preferably mounted on a horizontally extending profiled carrier, and there are provided vertical guide rods secured to the machine frame and guiding the profiled carrier for movement in the vertical directions.

In the alternative, the additional holding means for the object includes respective conveyor belt pairs trained about respective rollers that are rotatable about vertical axes, the distance needed for receiving the object being present between two of the rollers. Last but not least, the procesisng machine of the present invention also comprises separating means including a stationary wedge member arranged downstream of the additional holding means and operative for separating parts of the object as the latter is displaced by the displacement frame against the wedge member.

BRIEF DESCRIPTION OF THE DRAWING

The present invention will be described below in more detail with reference to the accompanying drawing in which.

DETAILED DESCRIPTION OF THE PREFERRED EMBODIMENTS

Figure 1:
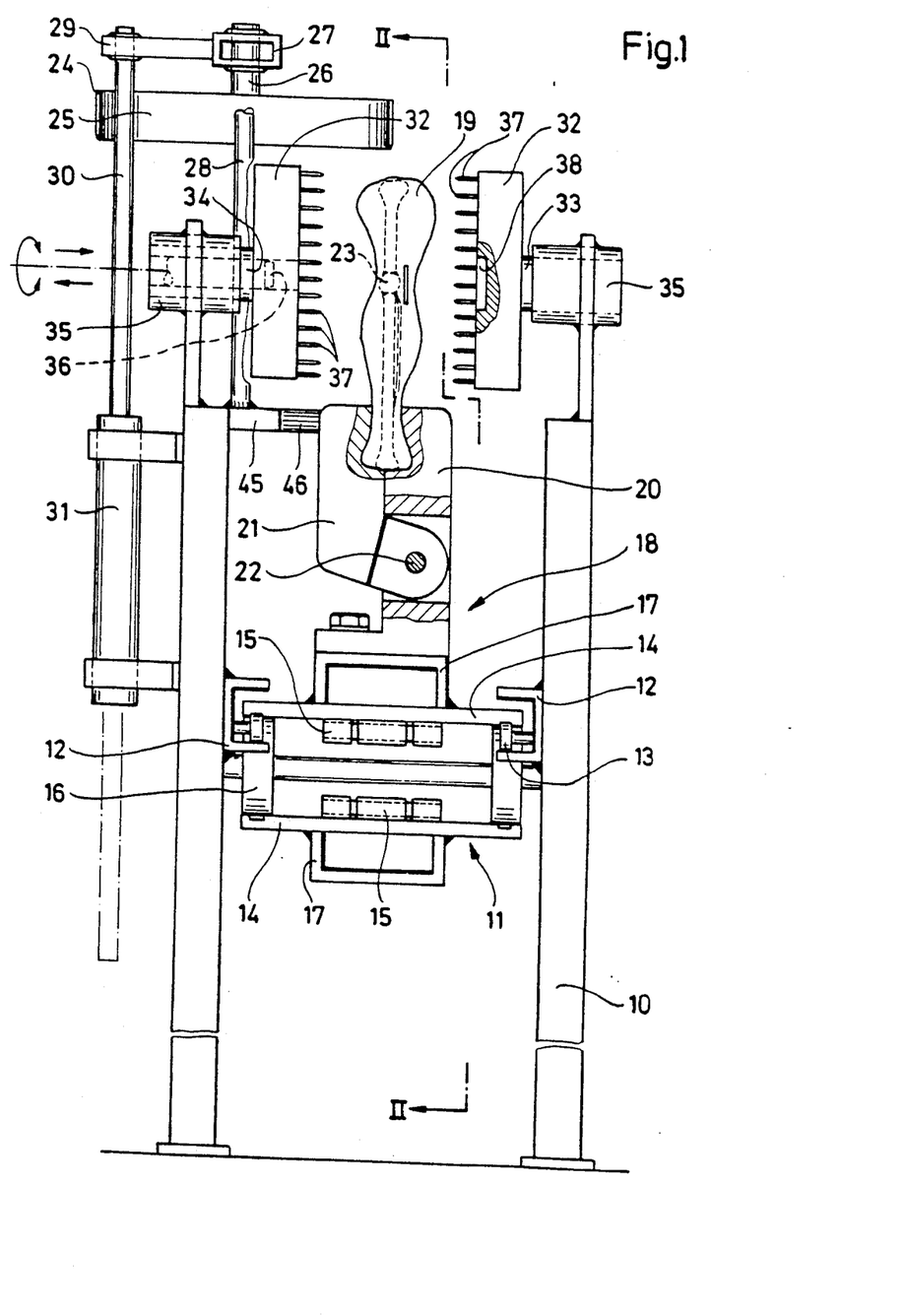
FIG. 1 is an elevational view of a cutting station of the processing machine of the present invention as considered in the displacement direction of the objects to be processed into the machine, with the cutting station being equipped with a stamping-out device.

Referring now to the drawing in detail, and first to FIG. 1 thereof, it may be seen that the reference numeral 10 has been used therein to identify a machine frame of a machine for processing objects, such as chicken parts or pieces of meat. The processing machine includes a drive conveyor which is mounted on the machine frame 10 and includes a conveyor chain 11 that is constructed as a hinge band chain and is guided in horizontal running rails 12. Within the running rails 12 which are provided with a U-shaped carrier, there are arranged carrier rollers 13 which are rotatable about horizontal axes and on which there are supported respective chain links 14. The conveyor chain 11 has a horizontal upper run and a horizontal lower run which is situated underneath the upper run. The chain links 14 of the conveyor chain 11 are connected with one another by means of respective hinges 15. At the ends of the upper and lower runs of the conveyor chain 11, there are arranged respective reversing rollers or sprockets 16 for the conveyor chain 11, these reversing rollers or sprockets 16 being rotatably mounted on the machine frame 10.

Respective connecting carriers 17 are mounted on the individual chain links 14, and adisplacement frame 18 for the accommodation of a respective object 19 is mountable on the respective connecting carriers 17. Each of the displacement frames 18 is equipped with a stationary gripping arm 20, and with a pivotable gripping arm 21 which is mounted on the displacement frame 18 by means of and for pivoting about a pivoting axle 22. The pivoting axle 22 extends in the displacement direction of the displacement frame 18 which is moved by the conveyor chain 11. The gripping arms 20 and 21 form, when in their closed position relative to one another, a cavity in which a small longitudinal portion of the object 19 can be situated and rigidly clamped. The objects 19 which come into consideration here may be, for instance, poultry leg parts such as chicken leg parts in each of which there are still present respective leg bones which are connected to one another by a cartilaginous joint 23. The respective object 19 which is clamped in the displacement frame 18 extends with a predominating part of its length out of the displacement frame 18 at the upper region of the displacement frame 18.

Figure 2:
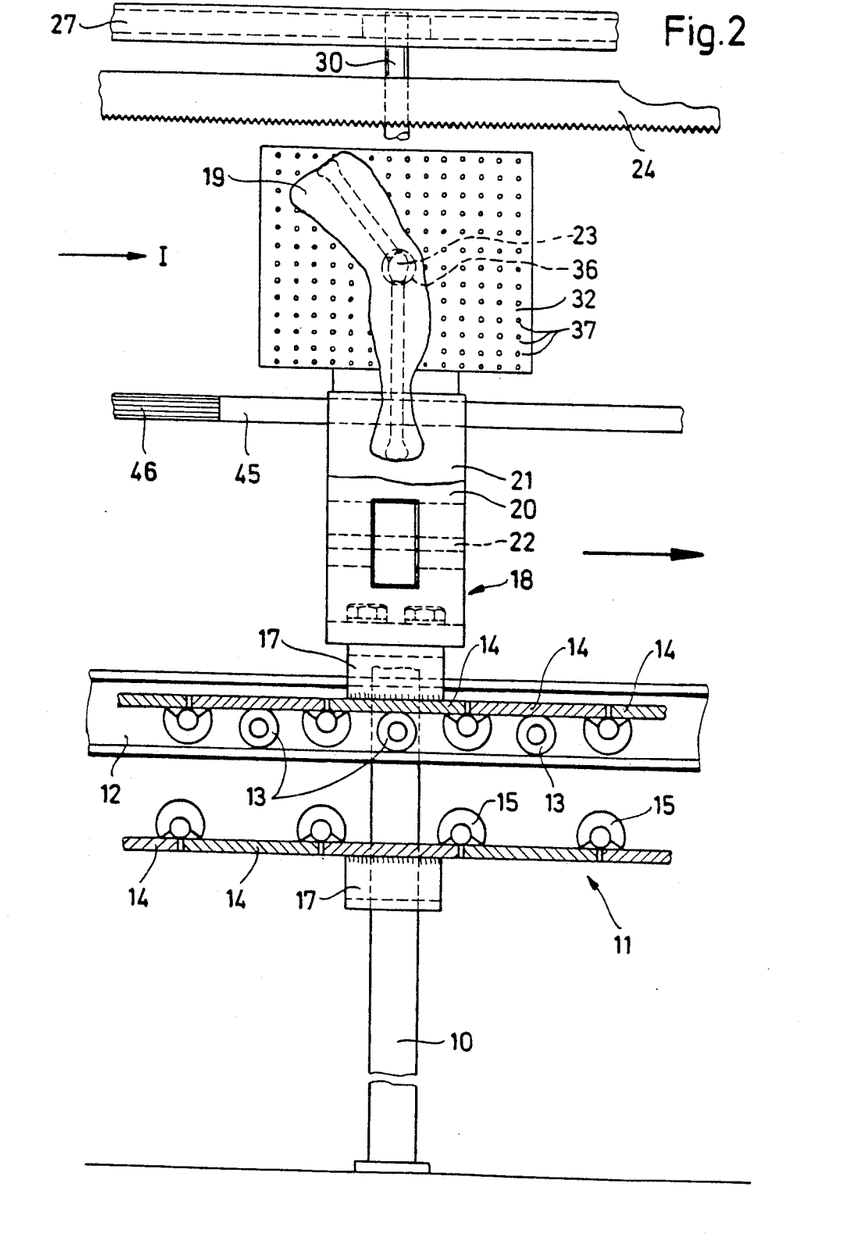
FIG. 2 is a partially sectioned side elevational view of the processing machine taken on line II—II of FIG. 1.

Along the course of the running rails 12, there is arranged a cutting station at which the respective object 19 is to be cut along its bones in order to be able to conveniently release the bone parts and separately recover the meat. For this purpose, the aforementioned cutting station is equipped with a band saw which includes a sawing band 24 which is trained in a taut fashion between a driving wheel and a reversing wheel 25 which is arranged at a spacing from the driving wheel. The driving wheel and the reversing wheel 25 are so arranged at the cutting station for rotation about respective vertically extending axles 16 that the operating or working range of the sawing band 24 is situated upwardly of the displacement frame 18 and of the space into which the predominating portion of the object 19 projects upwardly from the displacement frame 18. The driving wheel and the reversing wheel 25 are capable of being jointly shifted in the vertical directions by means of a shared holding arrangement. To be able to achieve this joint shifting, the rotation axes 26 of the driving wheel and of the reversing wheel 25 are mounted on a horizontally extending profiled carrier 27 which is guided at the cutting station on two guiding rods 28 for parallel movement longitudinally of such guiding rods 28 in the vertical directions. A horizontally extending cantilever beam 29 connects the profiled carrier 27 with a piston rod 30 of a vertically oriented cylinder-and-piston unit 31. The cylinder-and-piston unit 31 is mounted on the machine frame 10 and can be constructed as a double-acting pneumatic cylinder-and-piston unit. As a result of the above-mentioned construction, the driving wheel and the reversing wheel 25, together with the sawing band 24 of the band saw, are moved during the movement of the vertically extending piston rod 30 out of the cylinder-and-piston unit 31 in the upward direction, while the sawing band 24 is moved vertically downwardly as the piston rod is retracted into the cylinder-and-piston unit 31, and thus performs the processing operation on the respective object 19.

The object 19 must be firmly held in its position during the cutting operation. For this reason, the cutting station is provided with an additional fastening or holding arrangement which inlcudes two nail plates 32 which are so arranged and oriented as to face one another and extend vertically. The nail plates 32 are mounted on respective axially parallel shafts 33 and 34 which extend into lifting cylinder members 35 that are mounted on the machine frame 10. At least one of the shafts 33 and 34 for the nail plates 32, such as the shaft 34 is constructed, in order to be able to conduct turning and transverse movements, as a hollow shaft which terminates in an annular punching knife 36. The annular punching knife 36 projects beyond the end of the hollow shaft which points toward the object 19 and is axially shiftable inside the shaft 34 of the nail plate 32. After the movement of the shafts 33 and 34 out of the lifting cylinder members 35 toward the object 19, as a result of which respective nails 37 of the nail plates 32 penetrate into the meat material of the object 19 and, in this manner, securely hold the object 19 in position, the annular punching knife 36 is operated to cut the natural joint 23 out of the object 19. To this end, the opposite nail plate 31 is provided with a recess 38 in which the punching knife 36 can abut and thus is able to completely annularly separate the meat tissue of the object 19.

Figure 7:
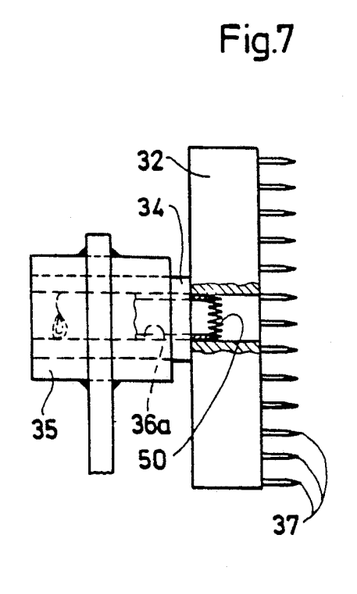
FIGS. 7 to 9 are side elevational views of modified constructions of the punching device arranged at the cutting station of FIGS. 1 and 2.

In a modified construction which is depicted in FIG. 7 of the drawing, the hollow shaft 34 is also shiftably received in the lifting cylinder member 35. However, here the additional shiftable hollow shaft 36a which is mounted in the hollow shaft 34 is provided with a projecting toothed formation 36b instead of the annular and evenly shaped cutting edge portion 36. Such a toothed formation 36b exhibits an especially good holding and cutting effect all around the respective joint cartilage 23.

Figure 8:
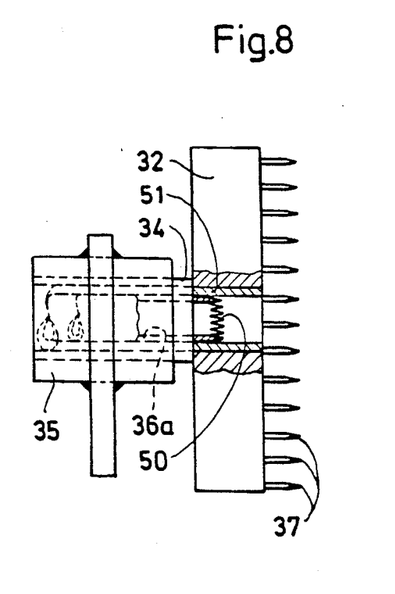

A further improved construction is depicted in FIG. 8 of the drawing. Here, in an identical manner as described above, the hollow shafts 34 and 36a a are shiftably or telescopically received in one another. However, in this construction, a third hollow shaft 51 is disposed between the inner hollow shaft 36a that is provided with a toothed formation 50, and the outer hollow shaft 34. The third hollow shaft 51 can also be displaced, in the same manner as the inner hollow shaft 36a, in the direction toward the object 19. This third or intermediate hollow shaft 51 is configured at its free end portion as a projecting annular holding portion 52 which comes into engagement with the object 19 and thus additionally holds the object 19 during the cutting operation.

Figure 9:
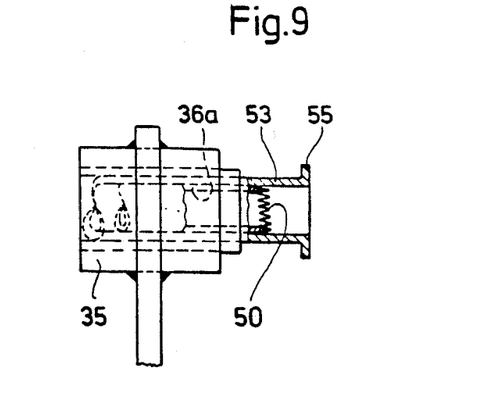

In the construction which is illustrated in FIG. 9 of the drawing, only two hollow shafts 53 and 36a are shiftably mounted in the lifting cylinder member 35; however, one of the nail plates 32 is omitted in this construction and instead of it there is provided on the hollow outer shaft 53 an outwardly projecting enlarged end portion or flange 55 which serves as a holding arrangement for the object 19. A relatively narrow lateral or circumferential surface of this enlarged end portion or flange 55 additionally presses the adjacent region of the meat tissue of the object 19 that is situated around the cartilaginous joint 23 laterally away, so that the cartilaginous joint 23 proper becomes more accessible to the cutting action.

Figure 3:
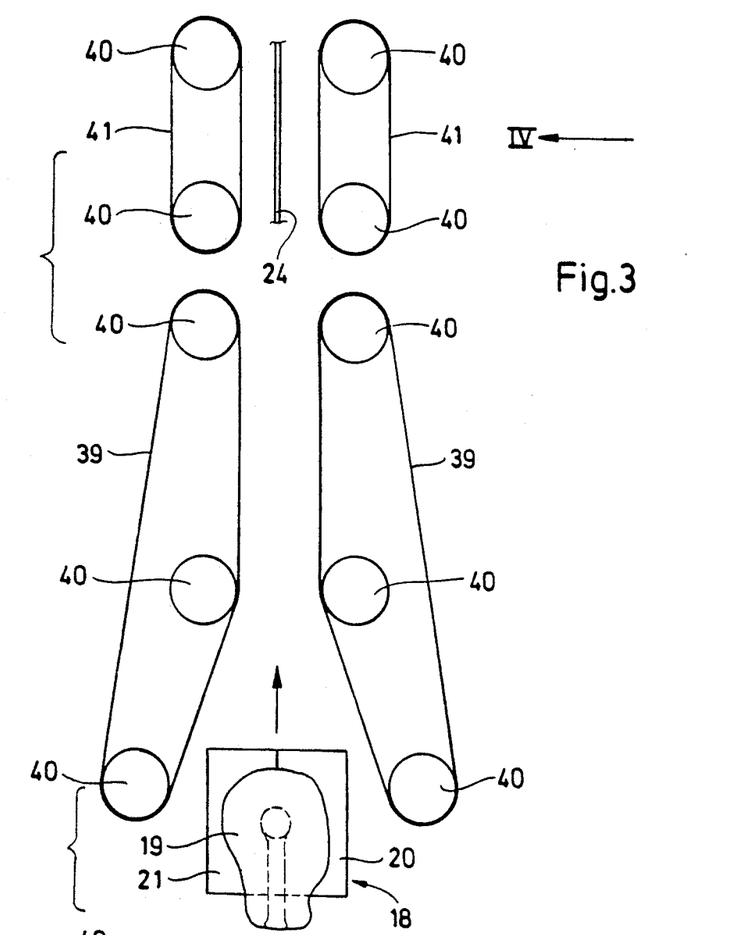
FIG. 3 is a diagrammatic top plan view of an additional holding device that is modified with respect to that of FIGS. 1 and 2 and includes holding conveyors.
Figure 4:
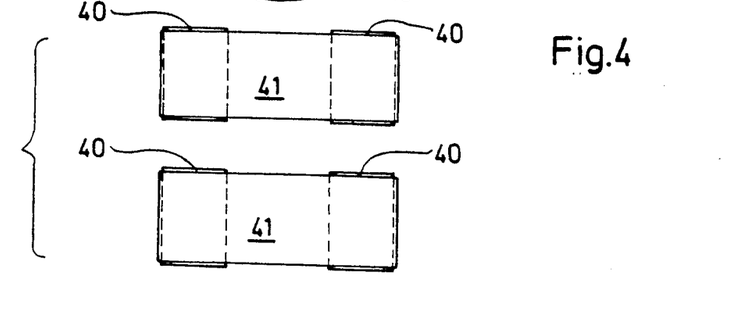
FIG. 4 is a diagrammatic side elevational view of a portion of the holding conveyors, taken in the direction of an arrow IV of FIG. 3.

FIGS. 3 and 4 of the drawing illustrate a modified additional fastening or holding arrangement for the object 19. This additional holding arrangement includes a plurality of pairs or mutually associated conveyor belts. In the first pair of two first conveyor belts 39, there are provided at each of the conveyor belts 39 three rollers 40 which are mounted for rotation about vertical axes. The two conveyor belts 39 are situated at a horizontal distance from one another. This distance decreases from its largest value encountered at a location at which the respective object 19 enters the space between the conveyor belts 39 to a constant smallest value which is so small that the object 19 is firmly held in place between the conveyor belts 39. An upper and lower pair of conveyor belts 41 can be arranged downstream of the pair of conveyor belts 39. The conveyor belts 41 are arranged above one another and are arranged at a constant distance from each other so as to present a penetration space for the cutting knife 36. The conveyor belts 41 are also tautly trained about rollers 40 that are rotatable about vertical axes.

Figure 5:
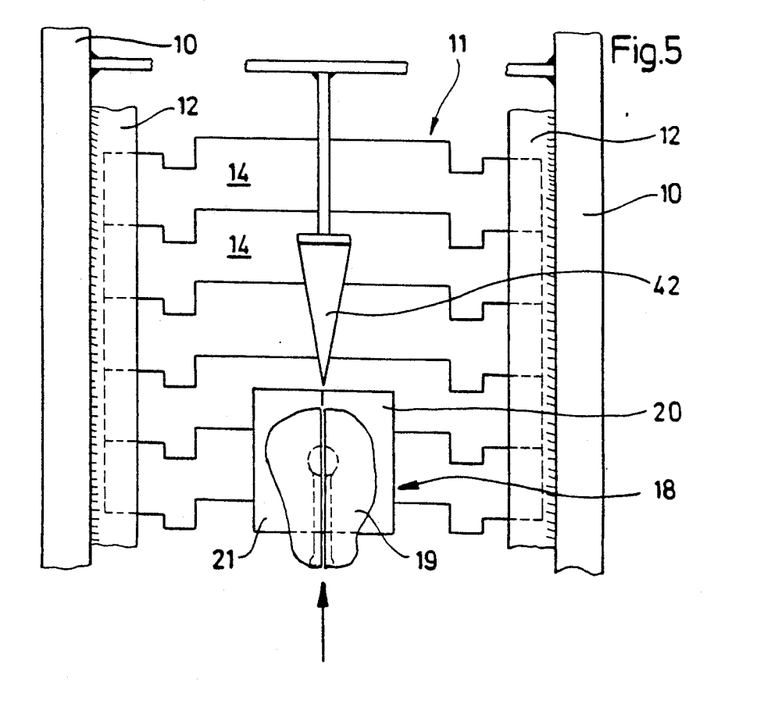
FIG. 5 is a diagrammatic top plan view of a dissociating station that is arranged downstream of the cutting station and includes a spreading wedge member for the object parts.
Figure 6:
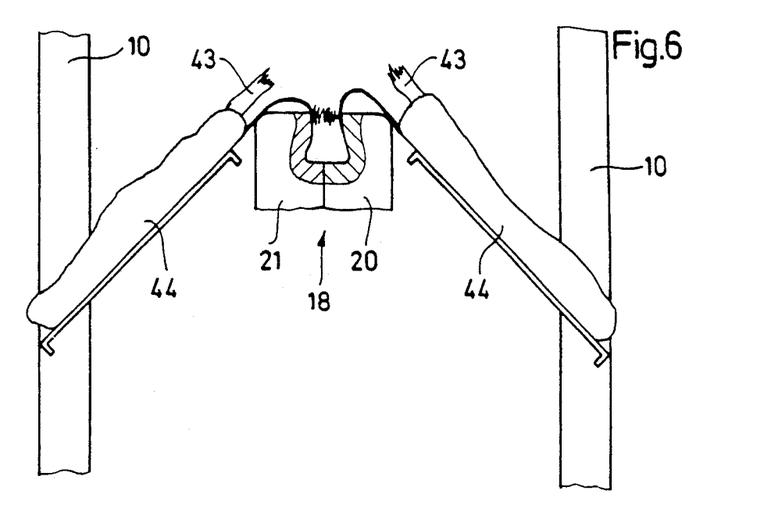
FIG. 6 is a diagrammatic end view illustrating the dissociated parts of the object downstream of the dissociating station.

After leaving the cutting or sawing station, the displacement frame 18 with the cut-up object 19 moves into a separating station of the processing installation. At the separating station, the object 19, which is cut up over a predominating part of its length, continues to be held at its lower end by the gripping arms 20 and 21 of the displacement frame 18 and moves with its separating gap against the point of a spreading wedge 42. During the further displacement of the displacement frame 18, the spreading wedge 42 separates the two halves of the object 19, so that these two halves are separated from one another all the way to the rupture of the bone of the lower leg at its clamping location. Thereafter, these two halves can be conveyed further as processed pieces. The bone halves 43 can now be removed in a simple manner from the cutting planes of respective object pieces 44.

For the closing of the gripping arms 20 and 21, the processing installation is provided with a pressing templet 45 which has an inclined surface 46 along which the pivotable gripping arms 21 slides during the displacement of the displacement frame 18, so that the pivotable gripping arm 21 is pressed by this inclined or cam surface of the pressing templet 45 toward and against the stationary gripping arm 20 while being pivoted towards its closed position. The object 19 which is being held firmly in position in this closed position of the pivotably gripping arm 21 relative to the stationary gripping arm 20 moves with the displacement frame 18 into the cutting or sawing station and is temporarily stopped thereat. At this time, the nail plates 32 are moved toward the object 19 and hold the same firmly at the cutting station, so that subsequently there can be performed the punching-out of the cartilaginous joint 23 and the sawing along the bones of the object 19. After the sawing band 24 has moved again out of the operating region, the nail plates 32 are moved back into their initial positions, so that the object 19 is released again. At this point in time, the displacement frame 18 can be displaced again to continue its displacement and reach the separating station where the spreading wedge 42 presses the two parts of the object 19 apart, until their bone halves break at their clamping locations. The object pieces 44 which have been obtained in this manner can then be removed from the displacement frame 18 and the bone halves 43 can be released and removed from the meat. In the meantime, the conveyor chain 11 has moved another displacement frame 18 with a new object 19 clamped therein into the cutting station for cutting up of this next following object 19.

It should be noted that the diameter of the ring-shaped cutting arrangement 36, 50 depends only on whether the cartilaginous joint 23 is cut out between an upper part and lower part (small diameter), or whether adjoining and thickened bone parts (large diameter) are to be cut out also.

While the present invention has been described and illustrated herein as embodied in a specific construction of an installation for processing particular chicken parts, it is not limited to the details of this particular construction, since various modifications and structural changes are possible and comtemplated by the present invention. Thus, the scope of the present invention will be determined exclusively by the appended claims.

What is claimed is:

1. A machine for processing objects such as poultry parts, meat pieces or the like, comprising
a machine frame;
endless conveyor means mounted on said frame for displacement;
a plurality of holding means mounted on said conveyor means for displacement therewith and each including a displacement frame and gripping means mounted on said displacement frame and operative for firmly holding one of the objects in each instance; and
means for dissociating bones and/or cartilaginous inclusions from meat tissue of the respective object, including a punch-type annular dissociating device mounted on said machine frame for automatic displacement transversely to the displacement direction of the objects.

2. The processing machine as defined in claim 1, wherein said dissociating device includes an annular punching element having a diameter corresponding to that of a cartilaginous joint.

3. The processing machine as defined in claim 2, wherein said annular punching element has a free end facing the object and having a cutting edge.

4. The processing machine as defined in claim 3, wherein said cutting edge has a toothed configuration.

5. The processing machine as defined in claim 1, further comprising additional holding means for holding the meat of the object at a separating station; and wherein said dissociating device is coupled with said additional holding means.

6. The processing machine as defined in claim 5, wherein said additional holding means includes a shaft which is configured as a turnable and axially shiftable hollow shaft received in a liftng cylinder member.

7. The processing machine as defined in claim 6, and further comprising a hollow support shaft for an annular punching knife for the object, which is mounted in said hollow shaft of said additional holding means for shifting into and out of the same.

8. The processing machine as defined in claim 6, wherein said hollow shaft of said additional holding means has a free end portion facing the object and provided with a holding punch zone.

9. The processing machine as defined in claim 8, wherein said holding punch zone has an annular configuration.

10. The processing machine as defined in claim 8, wherein said holding punch zone has a rectangular configuration.

11. The processing machine as defined in claim 8, and further comprising a further hollow shaft arranged in said hollow shaft of said additional holding means that is provided with said holding punch zone and serving as a punching element.

12. The processing machine as defined in claim 11, wherein said further hollow shaft is provided with cutting edges.

13. The processing machine as defined in claim 11, wherein said further hollow shaft is provided with toothed formations.

14. The processing machine as defined in claim 5, wherein said additional holding means for the object includes two vertically oriented nail plates which are movable horizontally toward and away from one another upwardly of the displacement path of said displacement frame.

15. The processing machine as defined in claim 5, wherein said additional holding means further includes lifting cylinder members mounted on said machine frame and horizontally extending shafts movable into and out of said lifting cylinder members and having said nail plates mounted thereon.

16. The processing machine as defined in claim 5, and further comprising sawing means arranged upstream of said additional holding means and including an endless sawing band trained about a driving wheel and a reversing wheel that are mounted for rotation about vertically oriented axes, said sawing means operating in a range situated upwardly of said conveying means.

17. The processing machine as defined in claim 16, wherein said axles of said driving and reversing wheels are mounted on a horizontally extending profiled carrier; and further comprising vertical guide rods secured to said machine frame and guiding said profiled carrier for movement in the vertical direction.

18. The processing machine as defined in claim 5, wherein said additional holding means for the object includes respective conveyor belt pairs trained about respective rollers that are rotatable about vertical axes, wherein a distance needed for receiving the object is present between two of the rollers.

19. The processing machine as defined in claim 5, and further comprising separating means including a stationary wedge member arranged downstream of said additional holding means and operative for separating parts of the object as the latter is displaced by said displacement frame against said wedge member.

* * * * *